United States Patent
Hevinga et al.

(12) 
(10) Patent No.: US 6,278,244 B1
(45) Date of Patent: Aug. 21, 2001

(54) CIRCUIT ARRANGEMENT FOR OPERATING A DISCHARGE LAMP IN SYNCHRONISM WITH AN IMAGE WRITING SIGNAL

(75) Inventors: Michel A. Hevinga, Eindhoven (NL); Holger Mönch, Vaals; Xaver Riederer, Aachen, both of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/466,408

(22) Filed: Dec. 17, 1999

(30) Foreign Application Priority Data

Dec. 21, 1998 (EP) .................................................. 98204377

(51) Int. Cl.⁷ .................................................... H05B 37/02
(52) U.S. Cl. ..................... 315/291; 315/209 R; 315/224; 315/DIG. 5
(58) Field of Search .............................. 315/224, DIG. 5, 315/291, 209 R

(56) References Cited

U.S. PATENT DOCUMENTS 5,608,294   3/1997   Derra et al. ...................... 315/224

FOREIGN PATENT DOCUMENTS

0406116A1   1/1991   (EP) .
WO9714275   4/1997   (WO) .

*Primary Examiner*—David Vu

(57) ABSTRACT

A circuit arrangement for operating a high pressure discharge lamp includes input terminals for connection to a supply voltage source, lamp connection terminals for connection of the lamp, and a power supply coupled to the input terminals. The power supply provides a current to the lamp in the form of successive periods of current and includes a pulse generating element for generating a current pulse superpositioned on the periods of the current to the lamp. The pulse generation element is synchronized with an image writing signal.

7 Claims, 1 Drawing Sheet

CIRCUIT ARRANGEMENT FOR OPERATING A DISCHARGE LAMP IN SYNCHRONISM WITH AN IMAGE WRITING SIGNAL

BACKGROUND OF THE INVENTION

The invention concerns a circuit arrangement for operating a high pressure discharge lamp comprising:

input terminals for connection to a supply voltage source;

lamp connection terminals for connection of the lamp, power supply means coupled to the input terminals for supplying a current to the lamp consisting of successive periods of current and comprising control means suitable for generating a current pulse superpositioned on periods of the current to the lamp.

Such a circuit arrangement is known from U.S. Pat. No. 5,608,294. The known circuit arrangement provides a measure to suppress flickering of a high pressure discharge lamp and is in particular suitable for operating a high pressure discharge lamp in a projection system like a projection television apparatus. In the known circuit arrangement, the lamp is supplied with a current of successive block shaped periods of opposite polarity. The suppression of flickering is reached by supplying to periods of the lamp current additional current pulses with the same polarity at the end of a predetermined fraction of such a period of a lamp current. By means of the thus reshaped current period, the temperature of the electrode is raised to a relatively high value, which high temperature increases the stability of the discharge arc, because the discharge arc originates from the same place on the electrode in each cathodic phase and so flickering is substantially suppressed. The additional current is supplied in a regular sequence, preferably at each successive period. This flickering suppression is of utmost importance as any instability in the discharge position in translated in an optical system like a projection system into a annoying flickering on the projection screen.

In circumstances where the operated lamp forms a part of a projection system with a liquid crystal display (further called LCD display), it has occurred that irregular brightness fluctuations can appear in the projected image. These are a nuisance for the spectator, in particular when those fluctuations have such rate of appearance that they gave the impression of a moving spot of different brightness.

SUMMARY OF THE INVENTION

The invention aims to provide a circuit arrangement for operating a high pressure discharge lamp in a way which substantially overcomes the mentioned drawback and simultaneously is maintaining the substantial suppression of flickering of the lamp during its operation.

According to the invention, a circuit arrangement of the kind mentioned in the opening paragraph is for this purpose characterized in that the circuit arrangement is adapted for synchronizing the control means with an image writing signal. An advantage, whatever might be the precise cause of the perceived brightness differences, they appear to be hardly distinguishable anymore to the human eye, while at the same time arc stability is maintained.

As image writing signals generally are provided with a synchronizing signal, this synchronizing signal of the image writing signal is preferably used for synchronizing the control means. In a preferable embodiment according to the invention the control means incorporates a microcontroller which triggers the generating of a current pulse on receiving at an input the image writing synchronizing signal. In a further preferred embodiment, in which the power supply means incorporates commutating means for supplying a lamp current of successive periods of current having opposite polarity, the image writing synchronizing signal is used for defining a commutating frequency. In a further preferred embodiment the microcontroller of the control means is provided with a threshold frequency value for comparing this value with a detected image writing synchronizing signal frequency and defining the commutating frequency equal to the synchronizing signal frequency if the latter is above the threshold value. In case the synchronizing frequency is below the threshold value the microcontroller defines the commutating frequency to be twice the synchronizing frequency. For any skilled person it will be evident that functions performed by the microcontroller, as just described, can be equally well realized in and performed by a circuit which is constructed without a microcontroller. However using an embodiment incorporating the microcontroller has the advantage that for use in different types of projection systems only adaptation of the software of the microcontroller is required.

BRIEF DESCRIPTION OF THE DRAWINGS

The above and further aspects of the invention will be explained in more detail below with reference to a drawing, in which.

DESCRIPTION OF THE PREFERRED EMBODIMENTS

Figure 1:
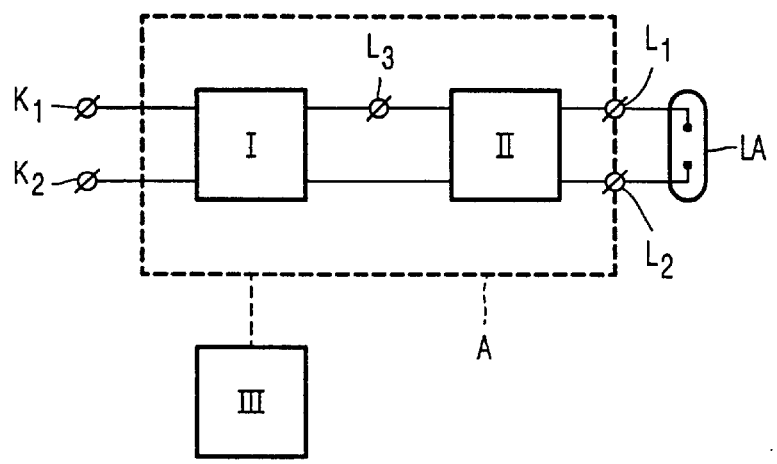
FIG. 1 shows schematically of a circuit arrangement according to the invention.

In FIG. 1, K1 and K2 denote input terminals for connection to a supply voltage source supplying a supply voltage. I, coupled to K1 and K2, is a means for generating a DC supply current. Output terminals of means I are connected to respective input terminals of a commutator II. Output terminals of commutator II are connected by lamp connection terminals to a high pressure discharge lamp La, which lamp is provided with at least two main electrodes being spaced apart by an electrode distance from each other. III is a control means to control the shape of successive periods of the current supplied to the lamp by controlling the means I and suitable for generating a current pulse superpositioned on periods of the current to the lamp. Means I commutator II and control means III together constitute power supply means A, coupled to the input terminals, for supplying the lamp current to the high pressure discharge lamp consisting of successive periods of current.

The operation of the circuit arrangement shown in FIG. 1 is as follows. When input terminals K1, K2 are connected to a voltage supply source, means I generates a dc supply current from the supply voltage supplied by the voltage supply source. Commutator II converts this dc current into an alternating current having successive periods of opposite polarity. By control means III the shape of the successive periods of the current thus formed and supplied to the lamp La is controlled. In a practical realization of the described embodiment the means I is formed by a rectifier bridge followed by a switch mode power circuit, for instance a Buck or down converter. Commutator II preferably comprises a full bridge circuit. Lamp ignition circuitry is also preferably incorporated in the commutator means II.

Figure 2:
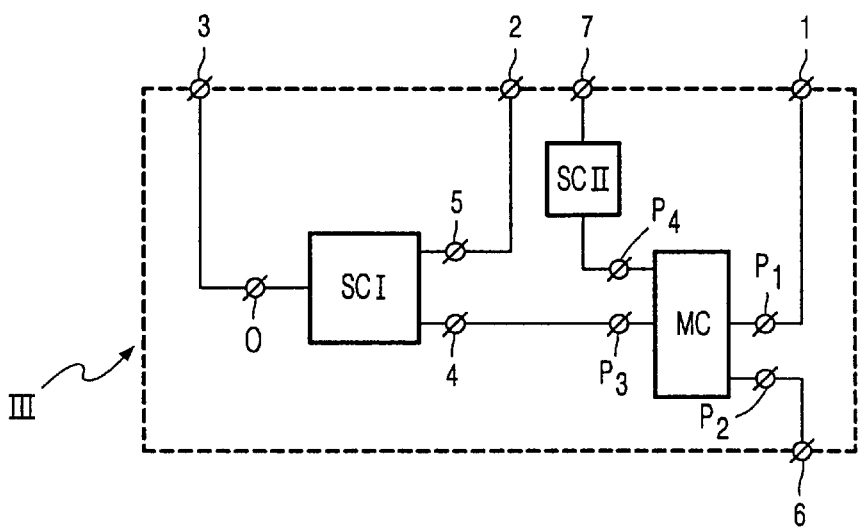
FIG. 2 shows control means of an embodiment of a circuit arrangement according to the invention in accordance with FIG. 1.

In FIG. 2, the control means III for controlling means I is shown in more detail. The control means III comprises an input 1 for detecting the lamp voltage, for instance the voltage across the terminals L1, L2 connected to the lamp forming a signal representing the lamp voltage. Preferably the lamp voltage representing signal is formed by detecting a voltage at a connection point L3, as the thus detected voltage is a dc voltage which will not be disturbed by the ignition voltage generated in the lamp ignition circuitry. Control means III further comprises an input 2 for detecting the current through an inductive means L of the converter forming the switch mode power circuit of the means I, which converter has at least a switch, and an output terminal 3 for switching the switch of the switch mode power circuit periodically in a conducting and a non-conducting state thus controlling the current through the induction means L of the converter. Input 1 is connected to connection pin P1 of a microcontroller MC. A connection pin P3 of the microcontroller is connected to an input 4 of a switching circuit SCI. Input 2 is connected to an input 5 of the switching circuit SCI, of which an output O is connected to output terminal 3. The microcontroller MC is further connected with an connection pin P2 to an input 6 for receiving a synchronizing signal by way of synchronization pulses from an image writing signal. A further connection pin P4 of the microcontroller MC is connected to further switching circuit SCII which via an output terminal 7 of the control means III switches the commutating means II.

The operation of the circuit arrangement shown in FIG. 2 with the converter being a Buck or down converter and the commutator being a full bridge incorporating 4 switches, is as follows: The microcontroller MC is provided with software containing a table of converter peak current values containing at least 2 values, a low one labeled as default and a high one to the occurrence of a synchronization pulse. On occurrence of the synchronization pulse at connection pin P2 the software in the microcontroller starts a timer and provides from the converter peak current table the high value at the connection pin P3. After a preselected time the thus started timer provides a signal at connection pin P4 which signal triggers the switching circuit SCII to generating a switching signal on which the commutator commutates the current. In the described practical embodiment this means switching the 4 bridge switches are switched in pairs from the conducting into the non-conducting state and vice versa, respectively. At the same time the timer triggers the microcontroller to select from the converter peak current table the default value and provide it at connection pin P3. As soon as a new synchronization pulse arrives at input 6 the described sequence of events restarts. The preselected time between occurrence of the synchronization pulse and triggering of the switch circuit SCII is calculated by the software as a programmed fraction of the timespan between 2 successive synchronization pulses. For a save operation of the embodiment the software is provided with a default value for setting the commutating switching frequency in case no synchronization signal is available. In the described embodiment this programmed fraction is 8%. A thus found converter peak current value is fed to switching circuit SCI at input 4 and used as reference for comparison for the detected current at input 2 which is also fed to the switching circuit SCI, at input 5. Based on this current values comparison the switching circuit generates a switching off signal at output O, which switches the switch of the down converter in the non-conducting state when the detected current equals the peak current value. As a result the current through the inductive means will decrease. The converter switch is kept in the non-conductive state until the current through the inductive means L becomes zero. On detecting the converter current becoming zero the switching circuit SCI generates at its output O a switch on signal that renders the switch of the down converter conductive. The current through the inductive means L now starts to increase until it reaches the peak current value. Such switching circuit SCI is for instance known from WO97/14275. The value of the peak current is thus refreshed each time that a synchronizing pulse is received and each time that the commutator commutates the current. Preferably the table of converter peak current values contains several sets of values indexed to lamp voltage values. Thus based on the detected value of the lamp voltage at connection pin P1 the corresponding current peak values are selected.

The detection of the lamp voltage is done with a repetition rate during each period depending on the shape of the current to be realized through the lamp and is controlled by a built in timer of the microcontroller MC. Using the lamp voltage a lamp parameter for detection has an advantage that it makes it possible to have a wattage control of the lamp inherently incorporated in the microcontroller software. In case the lamp current itself is taken as a parameter for detection in a wattage control would not only require an additional detection of the lamp voltage, but also an additional control procedure in the microcontroller. The down converter operates in a favorable embodiment at a frequency in the range of 45 kHz to 75 kHz.

Figure 3:
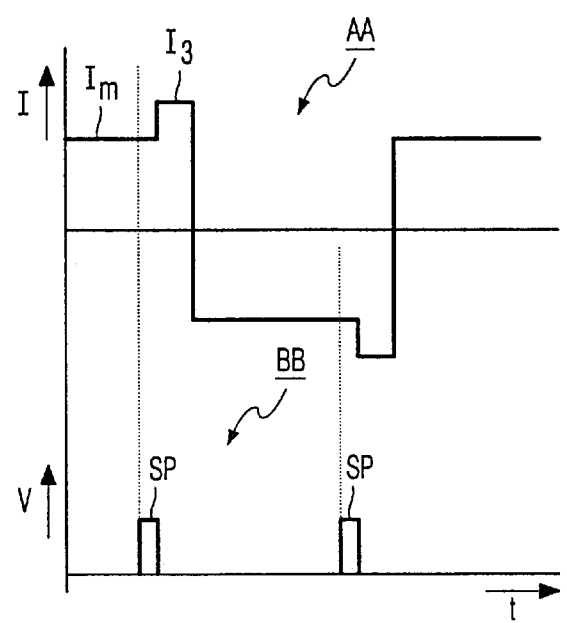
FIG. 3 is a graph of a lamp current provided by the arrangement according to FIG. 1.

A resulting lamp current as formed in a practical realization of the described practical exemplary embodiment of the circuit arrangement according to the invention is shown in the graph of FIG. 3 in combination with a synchronizing signal. Along the horizontal axis the time t is displayed. Along the vertical axis current I in case of curve AA and voltage V in case of curve BB is displayed. Curve AA displays the lamp current comprising successive periods of opposite polarity having a mean value Im, each period being provided with a current pulse superpositioned with value I3 thereto. Curve BB displays the synchronizing signal, which comprises synchronization pulses SP.

A practical embodiment of a circuit arrangement as described herein before has been used for the operation of a PHILIPS high pressure discharge lamp of the type UHP. The lamp, which had a nominal power consumption of 100 watts and an electrode distance of only 1.3 mm, was operated with a current according to FIG. 3. The value of the current is: Im=1.25 A. The embodiment was operated with the synchronization pulses having a synchronizing signal frequency in the range of 140 Hz to 280 Hz. In the absence of synchronization pulses the period duration tp is 5.6 ms, according to a operating frequency of the commutator means II of 180 Hz and resulting in a lamp current of 90 Hz. A PHILIPS microcontroller MC type a P87C749EBP has shown to be suitable, programmed to detect the lamp voltage once during each period. On occurrence of a synchronization pulse a current pulse as shown in FIG. 3 was superimposed on the lamp current during the latter 8% of each half period, resulting in a current I3 of 1.4*Im with which flickering was kept substantially suppressed and, when used in a projection system provided with a LCD display, substantially without irregular brightness fluctuations on the LCD display.

What is claimed is:

1. A circuit arrangement for operating a high pressure discharge lamp comprising:

input terminals for connection to a supply voltage source;

lamp connection terminals for connection of the lamp; and power supply means coupled to the input terminals for supplying successive periods of current to the lamp;

said circuit arrangement including control means for generating current pulses superpostioned on the periods of the current to the lamp, operation of the control means being synchronized with an image writing signal.

2. Circuit arrangement according to claim 1, characterized in that the image writing signal is provided with a synchronizing signal, said synchronizing signal being used for synchronizing the control means.

3. Circuit arrangement according to claim 1 or 2, characterized in that the control means includes a microcontroller for triggering the generation of a current pulse in response to receiving at an input the image writing synchronizing signal.

4. Circuit arrangement according to claim 3, characterized in that the power supply means incorporates commutating means for supplying the successive periods of current with alternately opposite polarities and that the image writing synchronizing signal is used for defining a commutating frequency.

5. Circuit arrangement according to claim 4, characterized in that the microcontroller of the control means is provided with a threshold frequency value for comparison with a detected image writing synchronizing signal frequency.

6. Circuit arrangement according to claim 5, characterized in that the microcontroller effects making of the commutating frequency equal to the synchronizing signal frequency if the synchronizing signal frequency is above the threshold value.

7. Circuit arrangement according to claim 5, characterized in that the microcontroller effects making of the commutating frequency to be twice the synchronizing frequency if the synchronizing frequency is below the threshold value.

* * * * *